(12) United States Patent
Valentine et al.

(10) Patent No.: US 7,138,449 B2
(45) Date of Patent: Nov. 21, 2006

(54) STABILIZED POLYESTER COMPOSITIONS AND MONOFILAMENTS THEREOF FOR USE IN PAPERMACHINE CLOTHING AND OTHER INDUSTRIAL FABRICS

(75) Inventors: Craig Stuart Valentine, Summerville, SC (US); Heping Zhang, Summerville, SC (US); Sanjay Patel, Summerville, SC (US)

(73) Assignee: Voith Paper Patent GmbH, Heidenheim (DE)

( * ) Notice: Subject to any disclaimer, the term of this patent is extended or adjusted under 35 U.S.C. 154(b) by 415 days.

(21) Appl. No.: 10/760,568

(22) Filed: Jan. 20, 2004

(65) Prior Publication Data

US 2004/0220300 A1 Nov. 4, 2004

Related U.S. Application Data

(63) Continuation of application No. PCT/IB02/03292, filed on Jul. 19, 2002.

(30) Foreign Application Priority Data

Jul. 21, 2001 (GB) ................................. 0117830.0

(51) Int. Cl.
*C08K 5/526* (2006.01)
(52) U.S. Cl. ...................... 524/120; 524/128; 524/147; 524/342; 524/351

(58) Field of Classification Search ................. 524/120, 524/128, 147, 342, 351
See application file for complete search history.

(56) References Cited

U.S. PATENT DOCUMENTS 3,492,368 A * 1/1970 Coover, Jr. et al. .......... 525/425
5,169,499 A * 12/1992 Eagles et al. ................ 428/175
5,283,110 A * 2/1994 Gardner et al. ............. 442/199
5,763,512 A * 6/1998 Schmitter ................... 524/119
5,981,062 A * 11/1999 Stroud et al. ................ 428/364

FOREIGN PATENT DOCUMENTS

DE 004307392 C1 * 4/1994

* cited by examiner

*Primary Examiner*—Peter Szekely
(74) *Attorney, Agent, or Firm*—Taylor & Aust, P.C.

(57) ABSTRACT

A polyester composition comprising from 90 to 97% by weight of at least one polyester derived from the condensation of 1,4-cyclohexane dimethanol and at least one dicarboxylic acid or an ester thereof, from 0.1 to 5% by weight of at least one primary anti-oxidant defined as an alkyl and/or alkyl peroxy radical scavenger, from 0.1 to 5% by weight of at least one secondary anti-oxidant defined as a compound capable of decomposing a hydroperoxide, from 1 to 4% by weight of at least one polyamide terpolymer. Utility of such a composition includes use in a monofilament yarn or fiber, use in a papermachine clothing including such a monofilament yarn or fiber and/or including the polyester composition.

12 Claims, 2 Drawing Sheets

STABILIZED POLYESTER COMPOSITIONS AND MONOFILAMENTS THEREOF FOR USE IN PAPERMACHINE CLOTHING AND OTHER INDUSTRIAL FABRICS

CROSS REFERENCE TO RELATED APPLICATIONS

This is a continuation of PCT application No. PCT/IBO2/03292, entitled "STABILISED POLYESTER COMPOSITIONS AND MONOFILAMENTS THEREOF FOR USE IN PAPERMACHINE CLOTHING AND OTHER INDUSTRIAL FABRICS", filed Jul. 19, 2002.

BACKGROUND OF THE INVENTION

1. Field of the Invention.

The present invention relates to stabilized polyester compositions and monofilaments thereof for use in papermachine clothing and other industrial fabrics.

2. Description of the Related Art.

Monofilaments manufactured from polyethylene terephthalate (or PET) are used extensively in the production of papermachine clothing and other industrial fabrics. A paper machine typically includes three sections. In the forming section, where the cellulosic fibers are presented to a forming fabric in the form of a slurry, the fabrics are predominantly constructed from polyester monofilaments, more specifically PET. In the forming section of the papermachine the temperature rarely exceeds 60° C. and the fabric is subjected to severe wear from suction boxes used to withdraw water from the paper web, such that the fabric life is seldom over 120 days. The paper sheet is transferred from the forming section into the press section of the papermachine and at this point the solids content of the slurry is approximately 20%. Here, the paper sheet passes through a series of nip rolls or shoe presses, and due to the need for resilience, polyamides have been the material of choice. The paper sheet has about 40% solids content as it is transferred from the press section into the dryer section of the papermachine.

In the dryer section, a textile fabric holds the paper sheet against steam-heated cylinders. The temperature of the cylinder surface can exceed 120° C. and the evaporation of water from the sheet ensures that the relative humidity remains at 100%. Fabrics composed of PET are conventionally used for most dryer fabric applications. However, towards the end of the paper machine, as the solids content approaches 80 to 90%, the cooling effect of the evaporation is reduced and the temperature to which the fabric is actually exposed increases such that the PET fabric is now subjected to significant degradation. In most applications, the life of a typical PET fabric can be in excess of 12 months. However, under these extreme conditions service life is reduced significantly.

In order to extend the service life of dryer fabrics exposed to these conditions, suppliers to the industry have used an array of materials as the constituent material of the dryer fabric. Polyphenylene sulphide (or PPS) provides excellent thermal, hydrolytic and oxidative stability. However, the PPS polymer is significantly more expensive than PET. Monofilament extrusion of PPS is more problematic, leading to a higher percentage of product rejections and therefore higher production costs.

Copolyesters derived from 1,4-cyclohexane dimethanol, terephthalic acid, isophthalic acid and esters thereof, have been suggested as a cheaper alternative. U.S. Pat. No. 5,169,499 teaches the use of such copolyesters to improve the hydrolytic stability of papermachine clothing. The large cyclohexane moiety present in the polymer backbone serves to provide steric hindrance to the hydrolytic cleavage of the ester bond. However, the cyclohexane ring also serves to increase the susceptibility of such polyesters to oxidative degradation. It is generally accepted that the oxidation of polymers follows a free radical chain reaction mechanism that is initiated by abstraction of a hydrogen atom from the polymer, forming an alkyl radical. This alkyl radical can very quickly react with oxygen to form an alkyl peroxy radical, which propagates additional reactions. Each cyclohexane ring, whilst providing steric hindrance, also introduces two tertiary hydrogen atoms into the backbone of the polymer; that is two hydrogen atoms that are each bonded to a tertiary carbon. Due to the effects of electron withdrawal, the carbon hydrogen bond strength is reduced, such that the abstraction of these hydrogen atoms is much more likely at elevated temperatures. Hence, polyesters that contain this type of cyclohexane moiety are more prone to oxidative degradation than PET which has no tertiary hydrogen atoms in its polymer backbone.

The art of stabilizing polymers to oxidation at elevated temperatures is extensive. U.S. Pat. No. 5,763,512 teaches the use of a combination of a sterically hindered phenol and a specific organic phosphite for the stabilization of polyamides, polyesters or polyketones against oxidative, thermal and/or light induced degradation. Sterically hindered phenols and other organic compounds that can form resonance-stabilized radicals, are known to scavenge alkyl and alkyl peroxy radicals formed during the oxidation of a polymer, and are commonly termed primary anti-oxidants. Tri-aryl phosphites and thioester compounds react with hydroperoxide moieties formed during oxidation, and are commonly referred to as secondary anti-oxidants. Polymer Science and Engineering, Vol. 30, No. 17, page 1041 by A. Aurebach et al. cited herein, describes blends of PCT and the use of certain anti-oxidants to improve melt stability.

U.S. Pat. No. 5,981,062 attempts to improve the stability of such polyesters through blending with polyamides, more specifically the blending of polyesters based upon a polyhydric alcohol of 1,4-cyclohexane dimethanol with 5 to 20% of a polyamide, preferably PA66. The blends are shown to improve the oxidative and hydrolytic stability of monofilaments manufactured therefrom.

Polyamide 66 is known to form gels if held at elevated temperatures for an extended period of time (see Nylon handbook published by Hanser/Gardner Publications 1995, Chapter 3, Page 55). Polyesters derived from 1,4-cyclohexane dimethanol and terephthalic acid (or its esters); i.e. PCT, or polyesters derived from 1,4-cyclohexane dimethanol and terephthalic and isophthalic acid (or their esters); i.e. PCTA, have melting points of 295° C. and 285° C. respectively. These high melting points necessitate high temperature processing and melt temperatures which can be in excess of 300° C. We have seen that this will lead to some degree of gel formation with polyamide 66 and can result in some thermal degradation of PA6. Gels occur during melt processing when cross-links form between individual polymer chains. In monofilament extrusion, the presence of gels leads to diameter variation at localized sections of the filaments that are very brittle and exhibit poor mechanical properties. It is known that these filaments break under the normal loads experienced in a weaving process. Such filaments are of an unacceptable quality.

It is known to those skilled in the art that polyesters and polyamides are generally incompatible, and tend to exhibit phase separation in the melt. Phase separation induces micro-voids and various structural defects, the effect of which is to introduce weak points observed as tenacity variation along the length of the monofilament. These defects can also affect the drawing process, reducing the efficiency of monofilament manufacture.

In addition, the blends alone do not provide sufficient oxidative stability to match that of the industry standard polyester, PET, ensuring that they, and the monofilaments and textile structures derived from them, cannot be used universally. What is needed in the art is further stabilization of such polyesters, as described herein, against thermo-oxidative degradation. Textile structures formed from such monofilaments may be woven for a plurality of said filaments, or they may be constructed from helical spiral coils of the monofilaments linked together by pintle yarns, a process that is described in U.S. Pat. No. 4,423,543.

SUMMARY OF THE INVENTION

The present invention provides a PCTA copolymer for use in papermachine clothing and/or other industrial fabrics, having good dry heat and hydrolysis resistance.

According to a first aspect of the present invention there is provided a polyester composition comprising from 90 to 97% by weight of at least one polyester derived from the condensation of 1,4-cyclohexane dimethanol and at least one dicarboxylic acid or an ester thereof, from 0.1 to 5% of at least one primary anti-oxidant defined as an alkyl and/or alkyl peroxy radical scavenger, from 0.1 to 5% of at least one secondary anti-oxidant defined as a compound capable of decomposing a hydroperoxide, from 1 to 4% of at least one polyamide terpolymer.

The composition further preferably comprises from 0.5 to 2% of at least one hydrolysis stabilizer.

According to a second, aspect of the present invention there is provided an article of papermachine clothing comprising the polyester composition of the aforesaid first aspect of the invention.

According to a third aspect of the present invention there is provided a monofilament comprising the polyester composition of the first aspect of the invention.

The polymer compositions of the present invention exhibit comparable resistance to thermo-oxidative degradation to standard PET and vastly superior hydrolytic degradation, particularly at elevated temperatures, and improved property uniformity. Consequently the polymer compositions of the present invention may be processed using standard equipment with consistent properties.

The polyester compositions (which term as used herein includes copolyesters) of the present invention are those containing a cyclohexane moiety in the polymer backbone.

The polyester preferably includes the condensation product of 1,4-cyclohexane dimethanol and terephthalic acid and/or an ester derivative of terephthalic acid. Ideally the polyester includes the condensation product of 1,4-cyclohexane dimethanol terephthalic and isophthalic acids and/or their ester derivatives. Suitable commercially available polyesters are those available from Eastman Chemical Co., of Kingsport Tenn. under the trade marks THERMX 3879 for PCT and THERMX 13319 for PCTA respectively.

The primary anti-oxidant may include from 0.1 to 5% by weight of the blend, and the secondary anti-oxidant may include from 0.1 to 5% by weight of the blend. The term "primary anti-oxidant" refers to a material that by way of its chemical composition can readily react with alkyl peroxy radicals forming more stable radicals that do not further propagate the chain reaction. These radicals can undergo further reaction with additional radicals to prevent them from propagating the oxidation chain. The most efficient primary anti-oxidants, by way of this reaction, are regenerated. The term "secondary anti-oxidant" refers to a class of additives that by way of their chemical composition can react with hydro-peroxide moieties formed as a result of the oxidation of a polymer, thus neutralizing these highly reactive species. Details of mechanisms involved in preventing oxidation are included in "Plastics Additives. Chapter 1 published by Hanser (1993)". The primary anti-oxidant is preferably a hindered phenolic compound.

The type of primary anti-oxidant described in this art is exemplified by, but not limited to the following:

The phenolic anti-oxidant illustrated above, i.e. pentaerythrityl (tetrakis-3-(3,5-di-tert.-butyl-4-hydroxy phenyl) propionate), CAS Number 6683-19-8, is sold under the trade name IRGANOX 1010 by Ciba Corporation.

The secondary anti-oxidant is preferably a phosphite. The type of secondary anti-oxidant described in this art is exemplified by, but not limited to the following:

The phosphite secondary anti-oxidant illustrated above; i.e. Bis(2,4-dicumylphenyl)pentaerythritol diphosphite, CAS No. 154862-43-8, is sold under the trade name DOVERPHOS® S-9228 by Dover Chemicals, Dover, Ohio.

The hydrolysis stabilizer added to the blend was chosen for its ability to neutralize the carboxyl end groups of the polyester and is added in quantities to minimize the problems associated with manufacturing monofilaments from the blend. The composition may include the hydrolysis stabilizer in an amount from 0.5 to 2% by weight. The preferred stabilizer is exemplified by, but not limited to, the class of compounds known as carbodiimides. These compounds may be used in the monomeric or polymeric forms. A specific example of this type of stabilizer is 2,6 diisopropylphenyl carbodiimide which is supplied under the trade name of STABAXOL I by Rhein Chemie GmbH.

The polyamide terpolymer stabilizer ideally has a melting point in the range from 120° C. to 220° C. The terpolymer is added such that it includes from 1 to 4% by weight of the blend. An example of such a terpolymer is sold commercially by Du Pont de Nemours under the trade name ELVAMIDE 8063. The term "terpolymer" as used herein refers to a polymer composed from more than two distinct repeat units as opposed to a homopolymer with one, and a copolymer with two. For example, a polyamide terpolymer may be composed of three or more repeat units such as 6, 6,6, 11 and 12. The type and ratio of the components has a significant influence upon the properties of the material, such that they are useful. The term "polyamide" refers to any of the known polyamides, which through polymerization, can be formed into terpolymers. Examples include, but are not limited to polyamide 6, polyamide 11, polyamide 12, polyamide 6,6, polyamide 6,9, polyamide 6,10, polyamide 6,12.

The blend of a polyamide terpolymer, a primary antioxidant and a secondary anti-oxidant as defined herein combine synergistically to provide a significant improvement in the ability of the polyesters described to withstand oxidation at elevated temperatures. Furthermore the additives in the composition of the present invention have high compatibility to the main resin, unlike many prior art compositions, resulting in the compositions of the present invention having uniform properties including color, tensile properties and resistance to degradation.

The polyester composition blends of the present invention provide improved melt extrusion and consequently the consistency of monofilaments produced by such extrusion is improved.

An extrusion processing aid in the form of a lubricant, such as silicone, may be added to the blend, and can include between 0.1 and 1% by weight of the final composition.

The polyester compositions of the present invention are particularly useful as papermachine clothing or other industrial fabrics where the textile is likely to be exposed to elevated temperatures in the presence of water or otherwise high levels of humidity are anticipated. Such fabrics may be woven from a plurality of filaments or formed from many spiral coils linked together in a construction commonly termed a spiral fabric and described in U.S. Pat. No. 4,423,543.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

The hydrolysis and oven aging resistance of a composition in accordance with the present invention were compared to that of a stabilized PET formulation, representing the industrial standard. Also, the hydrolysis and oven aging performance of the PCTA formulation reported in U.S. Pat. No. 5,981,062 was included for comparison.

EXAMPLE 1

In the following example, a comparison of the stabilizers that can be used is described, and their effect on the oxidative degradation of the monofilament outlined. The components in each sample were pre-blended, and then dried at 170° F. for 15 hours. Monofilament extrusion was carried out on a 1" single screw extruder with an L/D ratio of 25:1. The resins were gravity fed into the extruder from a hopper, into which a positive pressure of nitrogen gas was maintained to prevent moisture ingress. The composition of the samples is provided in Table 1, and the extrusion conditions employed in this example are provided in Table 2.

The physical properties of this monofilament as produced were measured according to ASTM D2256-97.

The shrinkage was tested according to ASTM D204 with the temperature modified to 204° C. The physical properties of the samples are outlined in Table 3. Oven aging tests were carried out using a forced air oven maintained at 204° C. (400° F.). Lengths of the monofilaments samples were wrapped into coils approximately 5 cm in diameter. The coils were tied into bundles and placed in the oven, samples being removed at set time intervals. The physical property retention was measured as a function of tenacity on an Instron Tensile Tester. The tenacity retention data is provided in Table 3.

TABLE 1

Composition of various samples, including samples 1–6 manufactured following the procedure outlined in Example 1.

| | Con-trol | 1 | 2 | 3 | 4 | 5 | 6 | PET |
|---|---|---|---|---|---|---|---|---|
| % PCTA | 99.7 | 98.7 | 98.7 | 89.7 | | 89.7 | 94.7 | 98.8 |
| % Irganox | | 0.5 | | | | | 0.5 | |

TABLE 1-continued

Composition of various samples, including samples 1–6 manufactured following the procedure outlined in Example 1.

|  | Control | 1 | 2 | 3 | 4 | 5 | 6 | PET |
|---|---|---|---|---|---|---|---|---|
| 1010 (hindered phenolic) | | | | | | | | |
| % Nylostab S-EED (hindered amine) | | | 0.5 | | | | | |
| % Doverphos S-9228 (phosphite) | | 0.5 | 0.5 | | | | 0.5 | |
| % tri-phenyl phosphate | | | | | | | | |
| % Polyamide 6 | | | | 10 | | | | |
| % Polyamide 6, 6 | | | | | 10 | | | |
| % Polyamide Terpolymer | | | | | | 10 | 4 | |
| % MB50-004 UHMW Silicone | 0.3 | 0.3 | 0.3 | 0.3 | 0.3 | 0.3 | 0.3 | |
| Staboxol I | | | | | | | 1.2 | |

TABLE 2

Extrusion and Draw conditions employed in the manufacturing of the samples 1–6.

|  | Control | 1 | 2 | 3 | 4 | 5 | 6 |
|---|---|---|---|---|---|---|---|
| Extruder Temperature Profile (C.) | | | | | | | |
| Throat | <60 | <60 | <60 | <60 | <60 | <60 | <60 |
| Feed Zone | 280 | 280 | 280 | 280 | 280 | 280 | 280 |
| Zone 2 | 285 | 285 | 285 | 285 | 285 | 285 | 285 |
| Zone 3 | 290 | 290 | 290 | 290 | 290 | 290 | 290 |
| Zone 4 | 290 | 290 | 290 | 290 | 290 | 290 | 290 |
| Zone 5 | 285 | 285 | 285 | 285 | 285 | 285 | 285 |
| Zone 6 | 275 | 275 | 275 | 275 | 275 | 275 | 275 |
| Adaptor | 285 | 285 | 285 | 285 | 285 | 285 | 285 |
| Die | 275 | 275 | 275 | 275 | 275 | 275 | 275 |
| Extrusion Conditions | | | | | | | |
| Extruder Pressure (psi) | 1000 | 1000 | 1000 | 1000 | 1000 | 1000 | 1000 |
| Die Pressure (psi) | 720 | 530 | 635 | 1030 | 750 | 600 | 680 |
| Torque (M.g.) | 2500 | 2500 | 2000 | 2500 | 2500 | 1900 | 2200 |
| Screw Speed (rpm) | 16 | 17 | 17 | 16 | 17 | 17 | 17 |
| Drawing Conditions | | | | | | | |
| Total Draw Ration | 3.33 | 3.33 | 3.33 | 3.33 | 3.33 | 3.33 | 3.33 |
| Draw Oven Temperatures (F.) | | | | | | | |
| Oven 1 | 300 | 300 | 300 | 300 | 300 | 300 | 300 |
| Oven 2 | 380 | 380 | 380 | 380 | 380 | 380 | 380 |
| Oven 3 | 430 | 430 | 430 | 430 | 430 | 430 | 430 |

TABLE 3

Physical property results for the manufactured samples 1–6.

| | Control | 1 | 2 | 3 | 4 | 5 | 6 | PET |
|---|---|---|---|---|---|---|---|---|
| Denier | 3450 | 3492 | 3534 | 3326 | 3492 | 3462 | 3432 | 2486 |
| Elongation @ Break (%) | 33 | 30 | 34 | 30 | 26 | 30 | 30 | 35 |
| Tenacity (g/d) | | | | | | | | |
| Initial | 2.24 | 2.22 | 2.2 | 2.18 | 2.21 | 1.83 | 1.83 | 3.8 |
| 24 hrs. | Failed | 2.22 | 1.72 | 1.36 | 1.43 | 1.57 | | |
| 39 hrs. | | 2.22 | 1.03 | 1.34 | 1.43 | 1.18 | | |
| 45 hrs. | | 2.22 | 1.03 | 0.96 | 1.36 | 1.3 | | |
| 65 hrs. | | 2.08 | Failed | Failed | Failed | 1.05 | 1.83 | 2.5 |
| 89 hrs. | | 1.56 | | | | 1.05 | 1.72 | 2.51 |
| 113 hrs. | | Failed | | | | Failed | 1.45 | 2.52 |

The control referred to in Tables 1 to 3 is PCTA as described in U.S. Pat. No. 5,981,062. Sample 6 is in accordance with the present invention.

Table 3 clearly shows that sample 5, manufactured using the polyamide terpolymer provides higher tenacity retention compared to either of the homopolymers PA6, or PA6,6 used in samples 3 and 4 respectively. In addition, comparison of samples 1, 5 and 6 illustrates the improvement found by combining the polyamide terpolymer and the anti-oxidants in a single blend.

Comparison of samples 1 and 2 shows the advantages of a hindered phenolic based anti-oxidant over a hindered amine, ensuring that this is the preferred primary anti-oxidant. By comparing samples 5 and 6 it is clear that the quantity of polyamide terpolymer used in the blend can be significantly reduced by utilizing a suitable combination of anti-oxidants. This provides advantages in processing, as the problems described herein associated with blending these two polymers are diminished significantly. This will be further illustrated in a later example.

A further embodiment of the present invention is the extension of the thermo-oxidative stability of the polyesters described herein such that they are comparable to the industry standard PET yarns. The data indicates that sample 6, which exemplifies the present invention retains 80% of its original tenacity after 113 hours at 204° C., whilst PET only retains 66% of its original tenacity following the same test period.

EXAMPLE 2

TABLE 4

Composition of samples 7–12, manufactured following the procedure outlined in Example 2 including extrusion and draw conditions.

| | Sample | | | | | |
|---|---|---|---|---|---|---|
| | 7 | 8 | 9 | 10 | 11 | 12 |
| Composition % | | | | | | |
| PCTA | 98.8 | 95.8 | 91.8 | 91.8 | 91.85 | 91.85 |
| Irganox 1010 | | 0.5 | 0.5 | 0.5 | 0.6 | 0.6 |
| Doverphos S-9228 | | 0.5 | 0.5 | 0.5 | 0.6 | |
| Di-stearyl thiadi-propionate | | | | | | 0.6 |
| Polyamide 6 | | | 4 | | | |
| Polyamide Terpolymar | | | | 4 | 3.35 | 3.75 |
| Lubricant | | | | | 0.4 | |
| Color | | 2 | 2 | 2 | 2 | 2 |
| Staboxol I | 1.2 | 1.2 | 1.2 | 1.2 | 1.2 | 1.2 |
| Extruder Profile (F.) | | | | | | |
| Zone 1 | 100 | 100 | 100 | 100 | 100 | 100 |
| Zone 2 | 500 | 500 | 560 | 560 | 560 | 560 |
| Zone 3 | 560 | 560 | 590 | 590 | 570 | 570 |
| Zone 4 | 560 | 560 | 600 | 600 | 580 | 580 |
| Zone 5 | 515 | 515 | 530 | 530 | 530 | 530 |
| Zone 6 | 575 | 575 | 580 | 580 | 580 | 580 |
| Zone 7 | 560 | 560 | 540 | 540 | 540 | 540 |
| Zone 8 | 560 | 560 | 540 | 540 | 540 | 540 |
| Zone 9 | 560 | 560 | 430 | 430 | 530 | 530 |
| Zone 10 | 560 | 560 | 530 | 530 | 530 | 530 |
| Zone 11 | 550 | 550 | 530 | 530 | 530 | 530 |

TABLE 4-continued

Composition of samples 7–12, manufactured following the procedure outlined in Example 2 including extrusion and draw conditions.

| | Sample | | | | | |
|---|---|---|---|---|---|---|
| | 7 | 8 | 9 | 10 | 11 | 12 |
| Adaptor | 550 | 550 | 560 | 560 | 560 | 560 |
| Head temperature setting | 556 | 556 | 560 | 560 | 560 | 560 |
| Extrusion Conditions | | | | | | |
| Die temperature setting | 518 | 518 | 560 | 560 | 560 | 560 |
| Extruder Pressure (psi) | 850 | 850 | 1000 | 1000 | 1000 | 1000 |
| Extruder Speed (rpm) | 125 | 125 | 140 | 140 | 125 | 125 |
| Drawing Conditions | | | | | | |
| Total Draw Ratio | 3.43 | 3.43 | 3.43 | 3.43 | 3.43 | 3.43 |
| Oven 1 | 300 | 300 | 300 | 300 | 300 | 300 |
| Oven 2 | 320 | 320 | 300 | 300 | 310 | 310 |
| Oven 3 | 330 | 330 | 290 | 290 | 280 | 280 |

TABLE 5

Physical property results for samples 7–12.

| | Sample | | | | | | |
|---|---|---|---|---|---|---|---|
| | 7 | 8 | 9 | 10 | 11 | 12 | PET |
| Tenacity (g/den) | 2.6 | 2.5 | 2.4 | 2.6 | 2.4 | 2.5 | 3.8 |
| Elongation @ Break (%) | 20 | 20 | 20 | 21 | 19 | 20 | 35 |
| Shrinkage @ 140° C. (%) | | | 13 | 12.5 | 14 | 13 | 2 |
| Hydrolysis Resistance Test | | | | | | | |
| Tenacity Retention After 24 hrs @ 170° C. Steam (g/den) | 0 | 0 | 2.16 | 1.51 | 2.27 | 1.62 | 0 |
| Oven-aging Test | | | | | | | |
| Tenacity Retention After 89 hrs @ 204° C. (g/den) | 0 | 1.7 | 1.94 | 1.92 | 2.16 | 2.15 | 2.5 |
| Tenacity Retention After 137 hrs @ 204° C. (g/den) | 0 | 0 | 0 | 1.19 | 1.94 | 1.73 | 1.63 |

Samples 10, 11 and 12 are in accordance with the present invention.

Figure 1:
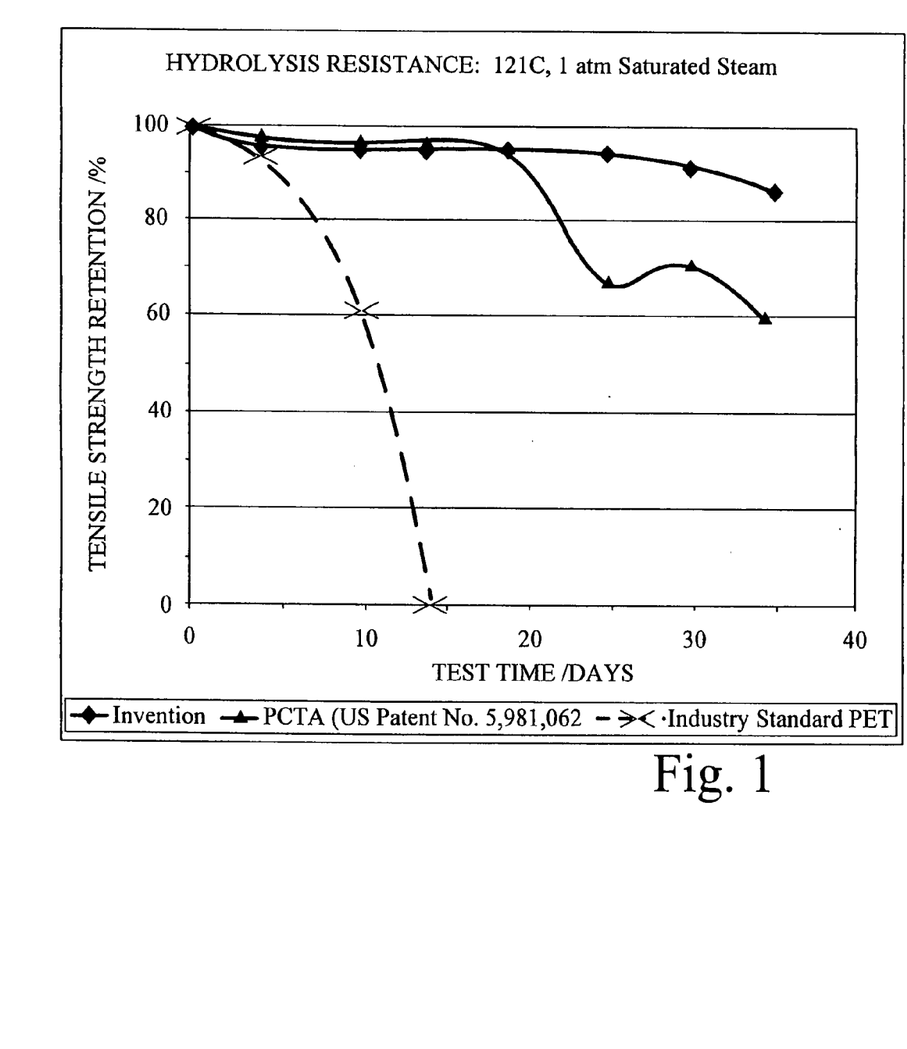
FIG. 1 is a graph of tensile strength retention as a function of time, illustrating the hydrolysis resistance of one example of the present invention compared with PET and PCTA. The hydrolysis test was performed as outlined in example 2.
Figure 2:
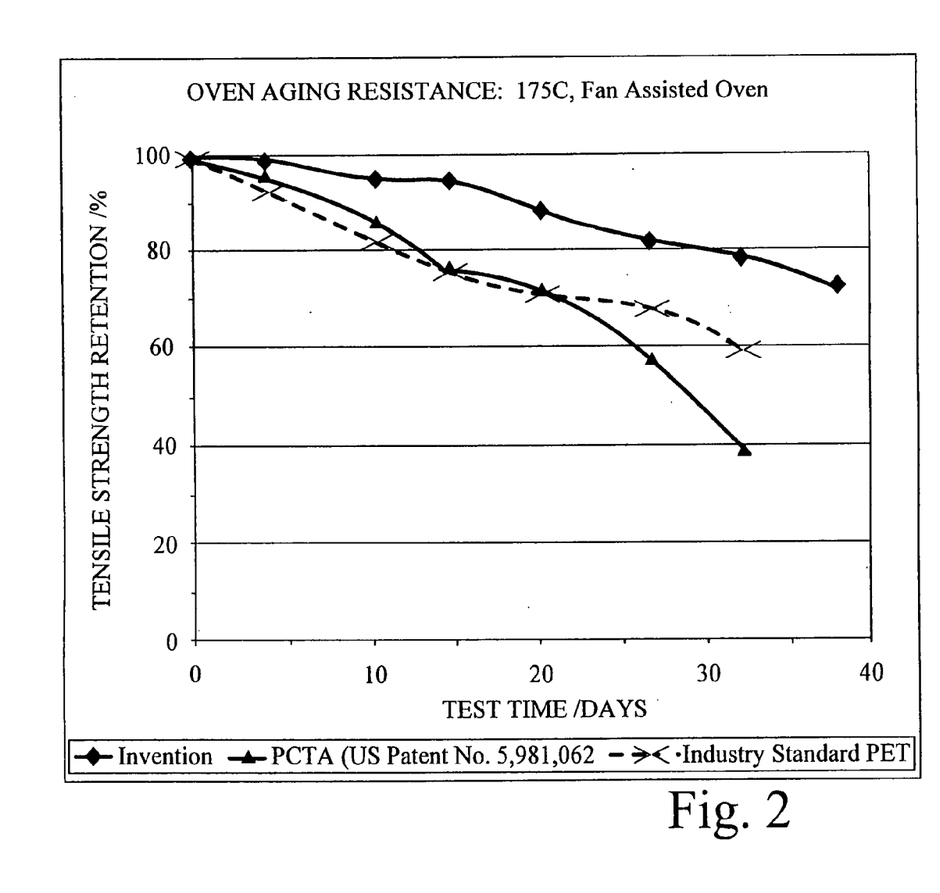
FIG. 2 is a graph of tensile strength retention as a function of time illustrating, the thermo-oxidative stability of one example of the invention compared with PET and PCTA. The oven-aging test was performed as outlined in Example 2.

In a further example of the present invention, samples of the blends were manufactured using a 147 mm co-rotating and intermeshing twin screw extruder. The PCTA resin was dried at 260° F. for six hours, the blend components being metered into the polyester using a gravimetric, blending system. The composition was fed into the extruder such that the rate of feeding could be controlled. Table 4 provides the compositions and extrusion conditions for the samples. An organic pigment in the form of a masterbatch in a polymeric carrier resin was added to the samples to facilitate observation of filament defects. Table 5 outlines the physical properties, and summarizes the hydrolysis resistance and oven aging tests. FIGS. 1 and 2 illustrate the performance of the best of these blends relative to PET.

Hydrolysis resistance was measured by placing monofilament samples, wrapped into coils of approximately 5 cm diameter, in a pressure vessel or autoclave. The tests were performed at 170° C. (7.6 atm steam pressure), and 120° C. (1.96 atm steam pressure). The tenacity retention was measured according to ASTMD2256-97. Oven aging tests were carried out at 175° C. and 204° C.

Comparing samples 7 and 8 it can be clearly seen that the anti-oxidants improve the resistance to oxidation in the oven-aging test. Sample 10, incorporating the polyamide terpolymer, has significantly better oxidative stability than sample 9, that utilizes polyamide 6. The combination of stabilizers used in sample 11 provides the best performance, illustrating that by using a combination of stabilizers, it was possible to reduce the level of the polyamide terpolymer and improve the resistance to the industry standard PET.

FIG. 1 provides a comparison of the hydrolytic stability of sample 12 and PET, tested at 120° C. (1 atm). Clearly the new composition provides significantly improved property retention over the industry standard PET.

FIG. 2 illustrates the tenacity retention of sample 12 through the oven-aging test at 175° C., with comparison to the industry standard PET. It is evident that this composition has better property retention at elevated temperatures than the industry standard PET.

EXAMPLE 3

TABLE 6

Composition of samples 13 and 14, manufactured following the procedure outlined in Example 3 including experimental data.

| | Sample | |
|---|---|---|
| | 13 | 14 |
| Composition % | | |
| PCTA | 90.1 | 91.85 |
| Irganox 1010 | 0.2 | 0.6 |
| Doverphos S-9928 | 0.2 | 0.6 |
| Polyamide Homopolymer | 4 | |
| Polyamide Terpolymer | | 3.75 |
| Lubricant | 1 | |
| Color | 3 | 2 |
| Staboxol I | 1.5 | 1.2 |
| Extrusion Pressure Range | 200 | 50 |

TABLE 6-continued

Composition of samples 13 and 14, manufactured following
the procedure outlined in Example 3 including experimental data.

|  | Sample | |
| --- | --- | --- |
|  | 13 | 14 |
| Variation (+/−) | | |
| Diameter Variation (%) | 1.5 | 0.7 |
| Filament Anomalies | Present | None |

Sample 14 is in accordance with the invention.

In this example, two samples were once again manufactured using a 147 mm co-rotating and intermeshing twin screw extruder according to the method outlined in example 2. The compositions, processing data and physical appearance measurements are provided in Table 6. The extruder pressure variation was plotted against time for each of the samples and the data is presented as the maximum pressure range observed during the production of the samples. The diameter was measured using a laser scanner, commercially available from Lazermike. The data is expressed as the maximum % range of the diameters measured during the production of the filaments. The scan rate, and dwell time on each filament was kept constant.

By switching from polyamide homopolymer to a terpolymer, and optimizing amount of anti-oxidants added to the composition, the pressure variation was reduced by a factor of 4. One consequence of this pressure reduction is an improvement in the consistency of the filaments derived. This is clearly illustrated by the improvement in diameter variation when comparing samples 13 and 14.

The filament anomalies may be defined as short term diameter variation, what are termed "slubs" by those versed in the art, and other areas of non-uniform structure expressed as short term color variation. Modification of the composition by using less polyamide, and suitable anti-oxidants at optimized addition levels eliminates the anomalies found in filaments extruded from blends of polyamide homopolymer and PCTA.

It is to be understood that the above described examples are by way of illustration only. Many modifications and variations are possible.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A polyester composition, comprising:
   at least one polyester derived from a condensation of a 1,4-cyclohexane di-methanol and at least one of a dicarboxylic acid and an ester of said dicarboxylic acid, said polyester composition having between approximately 90% to 97% by weight of said at least one polyester;
   at least one primary anti-oxidant defined as at least one of an alkyl and an alkyl peroxy radical scavenger, said polyester composition having between approximately 0.1% to 5% by weight of said at least one primary anti-oxidant;
   at least one secondary anti-oxidant defined as a compound capable of decomposing a hydroperoxide, said polyester composition having between approximately 0.1% to 5% by weight of said at least one secondary anti-oxidant; and
   at least one polyamide terpolymer, said polyester composition having between approximately 1% to 4% by weight of said at least one polyamide terpolymer.

2. The polyester composition of claim 1, further including at least one hydrolysis stabilizer, said polyester composition having between approximately 0.5% to 2% by weight of said at least one hydrolysis stabilizer.

3. The polyester composition of claim 1, wherein said at least one polyester includes a condensation product of a 1,4-cyclohexane di-methanol and at least one of a terephthalic acid and an ester derivative of said terephthalic acid.

4. The polyester composition of claim 3, wherein said at least one polyester includes a condensation product of a 1,4-cyclohexane di-methanol terephthalic and at least one of a isophthalic acid and an ester derivative of said isophthalic acid.

5. The polyester composition of claim 1, wherein said at least one primary anti-oxidant includes a hindered phenolic compound.

6. The polyester composition of claim 1, wherein said at least one secondary anti-oxidant includes a phosphite.

7. The polyester composition of claim 2, wherein said at least on hydrolysis stabilizer includes at least one of a monomeric carbodiimide and a polymeric carbodiimide.

8. The polyester composition of claim 1, wherein said polyamide terpolymer has a melting point between approximately 120° to 220°.

9. The polyester composition of claim 8, wherein said polyamide terpolymer stabilizer includes a copolymer of three different amide repeat units.

10. A monofilament, comprising:
    at least one of a yarn and a fiber, said at least one of a yarn and a fiber including a polyester composition having:
    at least one polyester derived from a condensation of a 1,4-cyclohexane di-methanol and at least one of a dicarboxylic acid and an ester of said dicarboxylic acid, said polyester composition having between approximately 90% to 97% by weight of said at least one polyester;
    at least one primary anti-oxidant defined as at least one of an alkyl and an alkyl peroxy radical scavenger, said polyester composition having between approximately 0.1% to 5% by weight of said at least one primary anti-oxidant;
    at least one secondary anti-oxidant defined as a compound capable of decomposing a hydroperoxide, said polyester composition having between approximately 0.1% to 5% by weight of said at least one secondary anti-oxidant; and
    at least one polyamide terpolymer, said polyester composition having between approximately 1% to 4% by weight of said at least one polyamide terpolymer.

11. A papermachine clothing, comprising:
    at least one monofilament having at least one of a yarn and a fiber, said at least one of a yarn and a fiber including a polyester composition having:
    at least one polyester derived from a condensation of a 1,4-cyclohexane di-methanol and at least one of a dicarboxylic acid and an ester of said dicarboxylic acid, said polyester composition having between approximately 90% to 97% by weight of said at least one polyester;

at least one primary anti-oxidant defined as at least one of an alkyl and an alkyl peroxy radical scavenger, said polyester composition having between approximately 0.1% to 5% by weight of said at least one primary anti-oxidant;

at least one secondary anti-oxidant defined as a compound capable of decomposing a hydroperoxide, said polyester composition having between approximately 0.1% to 5% by weight of said at least one secondary anti-oxidant; and at least one polyamide terpolymer, said polyester composition having between approximately 1% to 4% by weight of said at least one polyamide terpolymer.

12. A papermachine clothing, comprising:

a polyester composition having:

at least one polyester derived from a condensation of a 1,4-cyclohexane di-methanol and at least one of a dicarboxylic acid and an ester of said dicarboxylic acid, said polyester composition having between approximately 90% to 97% by weight of said at least one polyester;

at least one primary anti-oxidant defined as at least one of an alkyl and an alkyl peroxy radical scavenger, said polyester composition having between approximately 0.1% to 5% by weight of said at least one primary anti-oxidant;

at least one secondary anti-oxidant defined as a compound capable of decomposing a hydroperoxide, said polyester composition having between approximately 0.1% to 5% by weight of said at least one secondary anti-oxidant; and at least one polyamide terpolymer, said polyester composition having between approximately 1% to 4% by weight of said at least one polyamide terpolymer.

* * * * *